(12) United States Patent
Fudemoto et al.

(10) Patent No.: US 7,601,772 B2
(45) Date of Patent: *Oct. 13, 2009

(54) NANO-COMPOSITE AND METHOD THEREOF

(75) Inventors: Hiroyuki Fudemoto, Yokohama (JP); Xiaorong Wang, Hudson, OH (US); Victor J. Foltz, Akron, OH (US)

(73) Assignee: Bridgestone Corporation

( * ) Notice: Subject to any disclaimer, the term of this patent is extended or adjusted under 35 U.S.C. 154(b) by 187 days.

This patent is subject to a terminal disclaimer.

(21) Appl. No.: 11/642,190

(22) Filed: Dec. 20, 2006

(65) Prior Publication Data

US 2007/0161734 A1    Jul. 12, 2007

Related U.S. Application Data

(60) Provisional application No. 60/751,787, filed on Dec. 20, 2005.

(51) Int. Cl.
*C08K 9/04* (2006.01)

(52) U.S. Cl. .................. 524/186; 524/445; 524/447

(58) Field of Classification Search .............. 524/186, 524/445, 447; 501/145
See application file for complete search history.

(56) References Cited

U.S. PATENT DOCUMENTS

| | | | |
|---|---|---|---|
| 2,493,318 A | 1/1950 | Shonle et al. |
| 2,531,396 A | 11/1950 | Carter et al. |
| 3,972,963 A | 8/1976 | Schwab et al. |
| 4,233,409 A | 11/1980 | Bulkley |
| 4,247,434 A | 1/1981 | Vanderhoff et al. |
| 4,338,206 A | 7/1982 | Hammond et al. |
| 4,463,129 A | 7/1984 | Shinada et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,665,963 A | 5/1987 | Timar et al. |
| 4,764,572 A | 8/1988 | Bean, Jr. |
| 4,773,521 A | 9/1988 | Chen |
| 4,788,254 A | 11/1988 | Kawakubo et al. |
| 4,829,130 A | 5/1989 | Licchelli et al. |
| 4,829,135 A | 5/1989 | Gunesin et al. |

(Continued)

FOREIGN PATENT DOCUMENTS

DE    3434983    4/1986

(Continued)

OTHER PUBLICATIONS

Baranova, O.V. et al., "Effect of the Structure of Phase-Transfer Catalyst on the Rate of Alkaline Hydrolysis of N-Benzyloxycarbonylglycine 4-Nitrophenyl Ester in the System Chloroform-Borate Buffer", Russian Journal of Organic Chemistry, vol. 38, No. 3, pp. 378-384, 2002.

(Continued)

*Primary Examiner*—Katarzyna Wyrozebski
(74) *Attorney, Agent, or Firm*—Meredith E. Hooker; Nathan Lewis

(57) ABSTRACT

The present invention provides a nano-composite comprising a clay and a cationic mediator comprised of a hydrophobic unit and a cationic unit. The clay is exfoliated or intercalated by the cationic mediator. The present invention further provides a polymer formulation comprising the nano-composite. The nano-composite is practically useful in formulating compositions such as rubber and tire products with improved and well-balanced properties including gas permeability, cure properties, and/or mechanical properties etc.

21 Claims, 1 Drawing Sheet

U.S. PATENT DOCUMENTS

| | | | |
|---|---|---|---|
| 4,837,274 | A | 6/1989 | Kawakubo et al. |
| 4,837,401 | A | 6/1989 | Hirose et al. |
| 4,870,144 | A | 9/1989 | Noda et al. |
| 4,871,814 | A | 10/1989 | Gunesin et al. |
| 4,904,730 | A | 2/1990 | Moore et al. |
| 4,904,732 | A | 2/1990 | Iwahara et al. |
| 4,906,695 | A | 3/1990 | Blizzard et al. |
| 4,920,160 | A | 4/1990 | Chip et al. |
| 4,942,209 | A | 7/1990 | Gunesin |
| 4,956,107 | A | 9/1990 | Gutierrez et al. |
| 5,034,018 | A | 7/1991 | Gutierrez et al. |
| 5,036,138 | A | 7/1991 | Stamhuis et al. |
| 5,075,377 | A | 12/1991 | Kawakubo et al. |
| 5,100,947 | A | 3/1992 | Puydak et al. |
| 5,112,507 | A | 5/1992 | Harrison |
| 5,120,379 | A | 6/1992 | Noda et al. |
| 5,130,377 | A | 7/1992 | Trepka et al. |
| 5,169,914 | A | 12/1992 | Kaszas et al. |
| 5,178,702 | A | 1/1993 | Frerking, Jr. et al. |
| 5,219,945 | A | 6/1993 | Dicker et al. |
| 5,227,419 | A | 7/1993 | Moczygemba et al. |
| 5,229,020 | A | 7/1993 | Gutierrez et al. |
| 5,237,015 | A | 8/1993 | Urban |
| 5,238,466 | A | 8/1993 | Gutierrez et al. |
| 5,241,008 | A | 8/1993 | Hall |
| 5,247,021 | A | 9/1993 | Fujisawa et al. |
| 5,256,736 | A | 10/1993 | Trepka et al. |
| 5,262,502 | A | 11/1993 | Fujisawa et al. |
| 5,290,873 | A | 3/1994 | Noda et al. |
| 5,290,875 | A | 3/1994 | Moczygemba et al. |
| 5,290,878 | A | 3/1994 | Yamamoto et al. |
| 5,308,364 | A | 5/1994 | Gutierrez et al. |
| 5,331,035 | A | 7/1994 | Hall |
| 5,336,712 | A | 8/1994 | Austgen, Jr. et al. |
| 5,385,684 | A | 1/1995 | Gutierrez et al. |
| 5,395,902 | A | 3/1995 | Hall |
| 5,399,628 | A | 3/1995 | Moczygemba et al. |
| 5,405,903 | A | 4/1995 | Van Westrenen et al. |
| 5,421,866 | A | 6/1995 | Stark-Kasley et al. |
| 5,436,298 | A | 7/1995 | Moczygemba et al. |
| 5,438,103 | A | 8/1995 | DePorter et al. |
| 5,447,990 | A | 9/1995 | Noda et al. |
| 5,462,994 | A | 10/1995 | Lo et al. |
| 5,476,521 | A | 12/1995 | Gutierrez et al. |
| 5,496,383 | A | 3/1996 | Franz et al. |
| 5,514,753 | A | 5/1996 | Ozawa et al. |
| 5,525,639 | A | 6/1996 | Keneko et al. |
| 5,527,870 | A | 6/1996 | Maeda et al. |
| 5,530,052 | A * | 6/1996 | Takekoshi et al. ............ 524/447 |
| 5,567,845 | A | 10/1996 | Franz et al. |
| 5,576,372 | A | 11/1996 | Kresge et al. |
| 5,576,373 | A | 11/1996 | Kresge et al. |
| 5,580,925 | A | 12/1996 | Iwahara et al. |
| 5,587,423 | A | 12/1996 | Brandstetter et al. |
| 5,594,072 | A | 1/1997 | Handlin, Jr. et al. |
| 5,614,579 | A | 3/1997 | Roggeman et al. |
| 5,627,252 | A | 5/1997 | De La Croi Habimana |
| 5,633,326 | A | 5/1997 | Patil et al. |
| 5,665,183 | A | 9/1997 | Kresge et al. |
| 5,688,856 | A | 11/1997 | Austgen, Jr. et al. |
| 5,707,439 | A | 1/1998 | Takekoshi et al. |
| 5,728,791 | A | 3/1998 | Tamai et al. |
| 5,733,975 | A | 3/1998 | Aoyama et al. |
| 5,739,267 | A | 4/1998 | Fujisawa et al. |
| 5,763,551 | A | 6/1998 | Wunsch et al. |
| 5,773,521 | A | 6/1998 | Hoxmeier et al. |
| 5,777,037 | A | 7/1998 | Yamanaka et al. |
| 5,807,629 | A | 9/1998 | Elspass et al. |
| 5,811,501 | A | 9/1998 | Chiba et al. |
| 5,834,563 | A | 11/1998 | Kimura et al. |
| 5,847,054 | A | 12/1998 | McKee et al. |
| 5,849,847 | A | 12/1998 | Quirk |
| 5,855,972 | A | 1/1999 | Kaeding |
| 5,883,173 | A | 3/1999 | Elspass et al. |
| 5,891,947 | A | 4/1999 | Hall et al. |
| 5,905,116 | A | 5/1999 | Wang et al. |
| 5,936,023 | A | 8/1999 | Kato et al. |
| 5,955,537 | A | 9/1999 | Steininger et al. |
| 5,986,010 | A | 11/1999 | Clites et al. |
| 5,994,468 | A | 11/1999 | Wang et al. |
| 6,011,116 | A | 1/2000 | Aoyama et al. |
| 6,013,699 | A | 1/2000 | Freeman et al. |
| 6,020,446 | A | 2/2000 | Okamoto et al. |
| 6,025,416 | A | 2/2000 | Proebster et al. |
| 6,025,445 | A | 2/2000 | Chiba et al. |
| 6,034,164 | A | 3/2000 | Elspass et al. |
| 6,060,559 | A | 5/2000 | Feng et al. |
| 6,087,016 | A | 7/2000 | Feeney et al. |
| 6,087,456 | A | 7/2000 | Sakaguchi et al. |
| 6,106,953 | A | 8/2000 | Zimmermann et al. |
| 6,117,932 | A | 9/2000 | Hasegawa et al. |
| 6,121,379 | A | 9/2000 | Yamanaka et al. |
| 6,147,151 | A | 11/2000 | Fukumoto et al. |
| 6,180,693 | B1 | 1/2001 | Tang et al. |
| 6,191,217 | B1 | 2/2001 | Wang et al. |
| 6,197,849 | B1 | 3/2001 | Zilg et al. |
| 6,204,354 | B1 | 3/2001 | Wang et al. |
| 6,225,394 | B1 | 5/2001 | Lan et al. |
| 6,255,372 | B1 | 7/2001 | Lin et al. |
| 6,268,451 | B1 | 7/2001 | Faust et al. |
| 6,277,304 | B1 | 8/2001 | Wei et al. |
| 6,348,546 | B2 | 2/2002 | Hiiro et al. |
| 6,359,075 | B1 | 3/2002 | Wollum et al. |
| 6,383,500 | B1 | 5/2002 | Wooley et al. |
| 6,420,486 | B1 | 7/2002 | DePorter et al. |
| 6,437,050 | B1 | 8/2002 | Krom et al. |
| 6,472,460 | B1 | 10/2002 | Okamoto et al. |
| 6,486,253 | B1 | 11/2002 | Gilmer et al. |
| 6,489,378 | B1 | 12/2002 | Sosa et al. |
| 6,573,330 | B1 | 6/2003 | Fujikake et al. |
| 6,598,645 | B1 | 7/2003 | Larson |
| 6,612,351 | B1 | 9/2003 | Zanzig |
| 6,617,020 | B2 | 9/2003 | Zhou et al. |
| 6,649,702 | B1 | 11/2003 | Rapoport et al. |
| 6,689,469 | B2 | 2/2004 | Wang et al. |
| 6,706,804 | B2 | 3/2004 | Resendes |
| 6,706,813 | B2 | 3/2004 | Chiba et al. |
| 6,727,311 | B2 | 4/2004 | Ajbani et al. |
| 6,750,297 | B2 | 6/2004 | Yeu et al. |
| 6,759,464 | B2 | 7/2004 | Ajbani et al. |
| 6,777,500 | B2 | 8/2004 | Lean et al. |
| 6,780,937 | B2 | 8/2004 | Castner |
| 6,818,693 | B2 | 11/2004 | Heinrich et al. |
| 6,835,781 | B2 | 12/2004 | Kondou et al. |
| 6,849,680 | B2 | 2/2005 | Knudson, Jr. et al. |
| 6,858,665 | B2 | 2/2005 | Larson |
| 6,861,462 | B2 | 3/2005 | Parker et al. |
| 6,872,785 | B2 | 3/2005 | Wang et al. |
| 6,875,818 | B2 | 4/2005 | Wang |
| 6,908,958 | B2 | 6/2005 | Maruyama et al. |
| 7,019,063 | B2 | 3/2006 | Wada et al. |
| 7,241,829 | B2 | 7/2007 | Chung et al. |
| 7,371,793 | B2 | 5/2008 | Gong et al. |
| 7,388,033 | B2 | 6/2008 | Nagy et al. |
| 2002/0045714 | A1 | 4/2002 | Tomalia et al. |
| 2002/0095008 | A1 | 7/2002 | Heinrich et al. |
| 2002/0144401 | A1 | 10/2002 | Nogueroles Vines et al. |
| 2003/0004250 | A1 | 1/2003 | Ajbani et al. |
| 2003/0032710 | A1 | 2/2003 | Larson |
| 2003/0124353 | A1 | 7/2003 | Wang et al. |
| 2003/0130401 | A1 | 7/2003 | Lin et al. |
| 2003/0149185 | A1 | 8/2003 | Wang et al. |
| 2003/0198810 | A1 | 10/2003 | Wang et al. |
| 2003/0225190 | A1 | 12/2003 | Borbely et al. |

| | | | |
|---|---|---|---|
| 2004/0059057 A1 | 3/2004 | Swisher et al. | |
| 2004/0127603 A1 | 7/2004 | Lean et al. | |
| 2004/0143064 A1 | 7/2004 | Wang | |
| 2004/0147639 A1 | 7/2004 | Tsou et al. | |
| 2004/0198917 A1 | 10/2004 | Castner | |
| 2004/0226643 A1 | 11/2004 | Yagi et al. | |
| 2004/0249045 A1 | 12/2004 | Goodman et al. | |
| 2005/0027057 A1* | 2/2005 | Dias et al. | 524/445 |
| 2005/0027062 A1 | 2/2005 | Waddell et al. | |
| 2005/0090611 A1 | 4/2005 | Huffer et al. | |
| 2005/0098252 A1 | 5/2005 | Muraoka et al. | |
| 2005/0101743 A1 | 5/2005 | Stacy et al. | |
| 2005/0137288 A1 | 6/2005 | Maruo et al. | |
| 2005/0203248 A1 | 9/2005 | Zheng et al. | |
| 2005/0215693 A1 | 9/2005 | Wang et al. | |
| 2005/0222335 A1 | 10/2005 | Jones et al. | |
| 2006/0100339 A1 | 5/2006 | Gong et al. | |
| 2006/0173115 A1 | 8/2006 | Wang et al. | |
| 2006/0205916 A1 | 9/2006 | Takekoshi et al. | |
| 2006/0235128 A1 | 10/2006 | Wang et al. | |
| 2007/0293684 A1* | 12/2007 | Fudemoto et al. | 548/335.1 |

FOREIGN PATENT DOCUMENTS

| | | |
|---|---|---|
| EP | 0143500 | 6/1985 |
| EP | 0265142 | 4/1988 |
| EP | 0590491 | 4/1994 |
| EP | 1099728 | 5/2001 |
| EP | 1125927 | 8/2001 |
| EP | 1134251 | 9/2001 |
| EP | 1273616 | 1/2003 |
| EP | 1321489 | 6/2003 |
| JP | 1279943 | 1/1989 |
| JP | 1955517 | 8/1989 |
| JP | 5132605 | 5/1993 |
| JP | 08199062 | 8/1996 |
| JP | 3356001 | 10/2002 |
| JP | 2003-095640 | 4/2003 |
| WO | 9104992 | 7/1991 |
| WO | 9853000 | 11/1998 |
| WO | 9942518 | 8/1999 |
| WO | 0187999 | 11/2001 |
| WO | 02031002 | 7/2002 |
| WO | 02081233 | 10/2002 |
| WO | 02100936 | 12/2002 |
| WO | 03085040 | 10/2003 |
| WO | 2004/058874 | 7/2004 |
| WO | 2005/065430 | 8/2004 |
| WO | 2005/095506 | 10/2005 |
| WO | 2007/149842 | 12/2007 |

OTHER PUBLICATIONS

Gilman, J.W. et al., "Recent Advances in Flame Retardant Polymer Nanocomposites", pp. 273-283.
Hay, J.N. et al., "A Review of Nanocomposites" [2000].
Wang, Yizhong et al., "Preparation and Characterization of Rubber-Clay Nanocomposites", Journal of Applied Polymer Science, vol. 78, pp. 1879-1883 (2000).
Webb, Paul B. et al., "Continuous Flow Hydroformylation of Alkenes in Supercritical Fluid-Ionic Liquid Biphasic Systems", J. Am. Chem. Soc., vol. 125, pp. 15577-15588, 2003.
Wilkes, John S. et al., "Dialkylimidazolium Chloroaluminate Melts: A New Class of Room-Temperature Ionic Liquids for Electrochemistry, Spectroscopy, and Synthesis", Inorg. Chem., vol. 21, pp. 1263-1264, 1982.
International Search Report with Written Opinion dated Dec. 27, 2007 from corresponding PCT Application No. PCT/US2007/071539 (11 pp.).
Bahadur, Pratap, "Block copolymers- Their microdomain formation (in solid state) and surfactant behaviour (in solution)", Current Science, vol. 80, No. 8, pp. 1002-1007, Apr. 25, 2001.
Guo, Andrew et al., "Star Polymers and Nanospheres from Cross-Linkable Diblock Copolymers", Macromolecules, vol. 29, pp. 2487-2493, Jan. 17, 1996.
Ishizu, Koji et al., "Core-Shell Type Polymer Microspheres Prepared from Block Copolymers", Journal of Polymer Science: Part C: Polymer Letters, vol. 26, pp. 281-286, 1988.
Ishizu, Koji, "Synthesis and Structural Ordering of Core-Shell Polymer Microspheres", Prog. Polym. Sci., vol. 23, pp. 1383-1408, 1998.
O'Reilly, Rachel K. et al., "Cross-linked block copolymer micelles: functional nanostructures of great potential and versatility", Chem. Soc. Rev., vol. 35, pp. 1068-1083, Oct. 2, 2006.
Oranli, Levent et al., "Hydrodynamic studies on micellar solutions of styrene-butadiene block copolymers in selective solvents", Can. J. Chem., vol. 63, pp. 2691-2696, 1985.
Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.
Riess, Gerard, "Micellization of block copolymers", Prog. Polym. Sci., vol. 28, pp. 1107-1170, Jan. 16, 2003.
Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.
Thurmond, K. Bruce et al., "Shell cross-linked polymer micelles: stabilized assemblies with great versatility and potential", Colloids and Surfaces B: Biointerfaces, vol. 16, pp. 45-54, 1999.
Wilson, D.J. et al., "Photochemical Stabilization of Block Copolymer Micelles", Eur. Polym. J., vol. 24, No. 7, pp. 617-621, 1988.
Russell, Graham, Nov. 4, 2008 Office Action from European Patent Application No. 05742316.2 filed Mar. 28, 2005 (2 pp.).
May 28, 2004 International Search Report from PCT Patent Application No. PCT/US03/40375 filed Dec. 18, 2003 (3 pp.).
Aug. 1, 2005 International Search Report from PCT Patent Application No. PCT/US2005/010352 filed Mar. 28, 2005 (3 pp.).
Dec. 27, 2007 International Search Report from PCT Patent Application No. PCT/US2007/071539 filed Jun. 19, 2007 (4 pp.).
Russell, G., Feb. 22, 2006 International Preliminary Report on Patentability from PCT Patent Application No. PCT/US2005/010352 (7 pp.).
Canham et al., "Formation of Worm-like Micelles from a Polystyrene-Polybutadiene-Polystyrene Block Copolymer in Ethyl Acetate", J.C.S. Faraday I, 76, 1857-1867 (1980).
Chen, Wei et al., "Ultrahydrophobic and Ultralyophobic Surfaces: Some Comments and Examples", The ACS Journal of Surfaces and Colloids, vol. 15, No. 10, pp. 3395-3399 (May 11, 1999).
Cosgrove, T. et al., "Adsorbed Block Copolymer of Poly(2-vinylpyridine) and Polystyrene Studied by Neutron Reflectivity and Surface Force Techniques", Macromolecules, 26, pp. 4363-4367 (1993).
Coulson, S.R. et al., "Super-Repellent Composite Fluoropolymer Surfaces", The Journal of Physical Chemistry B, vol. 104, No. 37, pp. 8836-8840 (Sep. 21, 2000).
Dieterich, W. et al., "Non-Debye Relaxations in Disordered Ionic Solids", Chem. Chys., 284, pp. 439-467 (2002).
Ege, Seyhan, Organic Chemistry Structure and Reactivity, 3rd Edition, p. 959 (1994).
Greenwood, N.N. et al., Chemistry of the Elements, Pergaroen Press, New York, pp. 1126-1127 (1984).
Hardacre, C. et al., "Structure of molten 1,3-dimethylimidazolium chloride using neutron diffraction", J. Chem. Physics, 118(1), pp. 273-278 (2003).
Hoffman, B. et al., "Rheology of Nanocomposites Based on Layered Silicates and Polyamide-12", Colloid Polm. Sci.., 278, pp. 629-636 (2000).
Ishizu, Koji, "Star Polymers by Immobilizing Functional Block Copolymers", Star and Hyperbranched Polymers, ISBN 0-8247, pp. 135-178 (1999).
Jensen, M. et al., "EXAFS Investigations of the Mechanism of Facilitated Ion Transfer into a Room-Temperature Ionic Liquid", Jacs, 124, pp. 10664-10665 (2002).
Krishnamoorti, R. et al., "Rheology of End-Tethered Polymer Layered Silicate Nanocomposites", Macromol., 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Ma, Hongyang et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Yuhong et al., "Synthesis and Properties of the Ionomer Diblock Copolymer Poly(4-vinylbenzyl triethyl ammonium bromide)-b-Polyisobutene", Journal of Polymer Science: Part A: Chemistry, vol. 41, pp. 2755-2764 (2003).

Mandema et al., "Association of Block Copolymers in Selective Solvents, 1 Measurements on Hydrogenated Poly(styrene-isoprene) in Decane and in trans- Decalin", Makromol. Chem. 180, pp. 1521-1538 (1979).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Moller, Martin et al., "Mineralization of Gold in Block Copolymer Micelles", Macromol. Symp., 117, pp. 207-218 (1997).

Mossmer, Stefan et al., "Solution Behavior of Poly(styrene)-block-poly(2-vinylpyridine) Micelles Containing Gold Nanoparticles", Macromolecules, 33, pp. 4791-4798 (2000).

Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).

Ren, J., "Linear Viscoelasticity of Disordered Polystyrene-Polyisoprene . . . Layered-Silicate Nanocomposites", Macromol., pp. 3739-3746 (2000).

Tiyapiboonchaiya, C. et la., "Polymer-in-Ionic-Liquid Electrolytes", Micromol. Chem. Phys., 203, pp. 1906-1911 (2002).

Tomalia, Donald A. et al., "Dendritic Macromolecules: Synthesis of Starburst Dendrimers", Macromolecules vol. 19, No. 9, pp. 2466-2468 (1986).

Tuzar et al., "Anomalous Behaviour of Solutions of Styrene-Butadiene Block Copolymers in Some Solvents", Makromol. Chem. 178, 22743-2746 (1977).

Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).

"Quatemary Ammonium Compounds", Encyclopedia of Chem Tech., 4th Ed., vol. 20, pp. 739-767 (1996).

Wang et al., U.S. Appl. No. 11/344,861, filed Feb. 1, 2006 entitled: "Nano-Composite And Compositions Therefrom".

* cited by examiner

NANO-COMPOSITE AND METHOD THEREOF

CROSS-REFERENCE

This application claims the benefit of U.S. Provisional Application No. 60/751,787, Filed Dec. 20, 2005, which is incorporated herein by reference.

BACKGROUND OF THE INVENTION

The present invention is directed to a nano-composite comprising a clay and a cationic mediator, wherein the cationic mediator comprises a hydrophobic unit and a cationic unit. The invention is further directed to a composition comprising the nano-composite and a polymer. The composition is useful in preparing products such as tires with improved and well-balanced properties including gas impermeability, cure rates, and superior mechanical characteristics, etc.

In manufacturing rubber products such as a tire, one needs to consider a wide range of factors and various balances between them, such as gas permeability, curing properties such as curing time and curing capability, traction characteristics on dry and wet surfaces, rolling resistance, tread-wear resistance, ring tensile, vulcanization plateau, Shore A hardness, rubber damping properties, elongation, strain, specific gravity, reliability, manufacturability, and cost effectiveness, among others. For example, gas impermeability is important for many rubber products where unsaturated bonds can be attacked by atmospheric ozone. These attacks may, over time, lead to oxidative degradation, which may subsequently lead to chain cleavage. As such, there exists a continuous interest in lowering gas permeability of polymers.

Since the discovery of exfoliated nylon/clay nano-composites by Usuki et al. (*J. Mater. Res.* 1993, 8, 1174), people have made extensive efforts to lower gas permeability by using well-exfoliated layered materials. A common morphology for miscible polymer-layered material dispersions is known as intercalation and exfoliation, which improves polymeric properties such as mechanical, gas barrier/permeability, thermal, and heat distortion temperature. However, for polymers, particularly nonpolar polymers, well-exfoliated polymer-layered material nano-composites are notoriously difficult to obtain. For example, Wang et. al in the *Journal of Applied Polymer Science*, Vol. 78, 1879-1883 (2000) describe a process of making clay-rubber mixtures by mixing a styrene-vinylpyridine-butadiene latex with a hydrophilic unmodified clay. The expansion of clay gallery was reported to increase only from 1.24 to 1.46 nm. The limited extent of intercalation is not expected to provide substantial property enhancement in rubber materials.

Although organic ammonium salts have shown improved capability in clay exfoliation, they typically have a low decomposition temperature. As an undesirable effect, organo-clays treated by the ammonium salts may damage or retard the cure process of the rubbery material, especially when free radical cure, sulfur cure, or ZnO cure is employed.

Advantageously, the present invention provides nano-composites that are useful in formulating compositions such as rubbers and tire products with improved and well-balanced properties including gas permeability, thermal stability, cure properties, and/or mechanical properties etc.

SUMMARY OF THE INVENTION

A first aspect of the present invention provides a nano-composite comprising (i) a clay and (ii) a cationic mediator comprised of a hydrophobic unit and a cationic unit, wherein the clay is exfoliated or intercalated by the cationic mediator.

A second aspect of the present invention provides a composition comprising the nano-composite and a polymer, wherein the clay of the nano-composite is exfoliated or intercalated by the cationic mediator or by a mixture of the cationic mediator and the polymer.

A third aspect of the invention provides a process for making a rubber article such as a tire.

DETAILED DESCRIPTION OF ILLUSTRATIVE EMBODIMENTS

Figure 1:
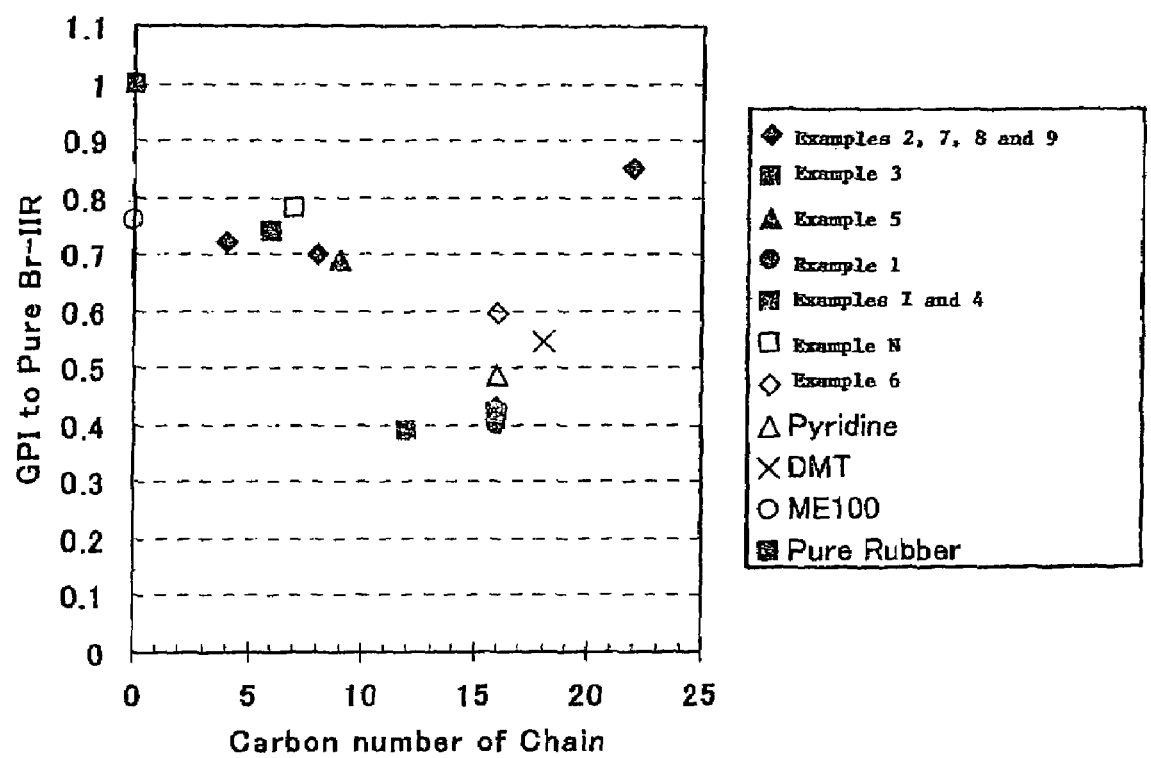
FIG. 1 shows the relationship between the gas permeability indexes (GPI) of some rubbery compositions versus the carbon numbers of the hydrophobic groups such as hydrocarbons in some imidazolium compounds. The imidazolium compounds were used to formulate rubber compositions.

It is to be understood herein, that if a "range" or "group" is mentioned with respect to a particular characteristic, for example, ratio, percentage, chemical group, and temperature etc., it relates to and explicitly incorporates herein each and every specific member and combination of sub-ranges or sub-groups therein. Thus, any specified range or group is to be understood as a shorthand reference to each and every member of a range or group individually as well as each and every possible sub-range or sub-group encompassed therein; and similarly with respect to any sub-ranges or sub-groups therein.

As one aspect the nano-composite comprises (i) a clay and (ii) a cationic mediator comprised of a hydrophobic unit and a cationic unit, wherein the clay is exfoliated or intercalated by the cationic mediator. Herein incorporated into this description are WO9853000; JP08199062; JP Publication Number 2003-95640A; U.S. Pat. Nos. 6,197,849; 5,707,439; J. S. Wikes, J. A. Levisky, B. A. Wilson, *Inorg. Chem.* 1982, 21, 1263-1264; J N Hay and S J Shaw "A Review of Nano-composites 2000"; and Gilman, J. W. et al "Recent Advances in Flame Retardant Polymer Nanocomposites".

The term "cationic mediator" used herein describes a chemical species able to effectively mediate, or compatiblize, immiscible organic polymer and inorganic layered materials such as clay, into a relatively homogenous state without phase separation. Generally, the mediator facilitates the intercalation of organic polymer between the layers of the layered material.

The cationic mediators of the invention may include, but are not limited to, those commonly known as surfactants. The nano-composites of the invention may include, but are not limited to, those commonly known as organo-clay, for example, organo-mica.

In one exemplary embodiment, the cationic mediator comprises at least one cationic unit, which typically is also hydrophilic, that can bind to the layers of inorganic layered material with effectively higher affinity than to an organic, and typically also hydrophobic material, such as butyl rubber or IIR. While a cationic mediator typically binds to an inorganic layered material by hydrophilic interaction or ionic bond, it can also bind or link to an organic material through a variety of physical and chemical forces such as hydrophobic interaction, covalent bonds, π-π stacking interaction, lock-key type interaction, hydrogen bonds, and coordination bonds etc. Accordingly, a cationic mediator of the present invention comprises, in addition to the "at least one cationic unit", an organic binding unit, for example, a sufficiently long alkyl chain, or a covalently bonded polymeric group etc.

The cationic unit may be monoatomic or polyatomic, and bears one or more elementary positive charges of the proton. Depending upon the specific structure of the cationic mediator, such as the presence or absence of a conjugated system and whether the cationic unit includes the conjugated system, the positive charge(s) can be either localized or delocalized. The cationic mediator can be accompanied by negatively charged species to balance its positive charge and neutralize the overall charge of the system. Although the negatively charged species is typically independent, e.g. a counter ion(s), it is also feasible that the negatively charged species is part of the cationic mediator, by which an inner salt is formed. In various embodiments, the counter ion of the cationic mediators may also be those negatively charged groups of the layers in the layered material, for example, after the cationic mediator has undergone cation exchange with the layered material by intercalating.

Throughout this description, it should be understood that a cationic mediator is typically accompanied by charge-equivalent counter ion(s), which, for simplicity, may not be so explicitly stated. Exemplary counter ions of the cationic mediator may include, but are not limited to, simple anions such as $Cl^-$, $Br^-$, $F^-$, $I^-$, $O^{2-}$, $S^{2-}$, $Se^{2-}$, $Te^{2-}$, $N^{3-}$, $As^{3-}$, and the like; and polyatomic anions such as $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^{3-}$, $NO_2^-$, $NO_3^-$, $C_2O_4^{2-}$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_4^-$, $ClO_3^-$, $ClO_4^-$, $BrO^-$, $BrO_2^-$, $BrO_3^-$, $BrO_4^-$, $IO^-$, $IO_2^-$, $IO_3^-$, $IO_4^-$, and the like. In one embodiment, the counter ion is $Cl^-$ or $Br^-$.

The hydrophobic unit of the cationic mediator may comprise a $C_{\geq 3}$ hydrocarbon group or a polymeric group. The symbol $C_{\geq 3}$ denotes "containing no less than 3 carbon atoms". For example, the $C_{\geq 3}$ hydrocarbon may include any saturated or unsaturated, substituted or unsubstituted, straight or branched, cyclic or acyclic $C_3$-$C_{50}$ alkyl or arylalkyl group.

Exemplary $C_{\geq 3}$ hydrocarbon groups of the invention include, but are not limited to, 3-phenyl-3-ene-propyl, 6-ene-hexyl, butyl, isobutyl, behenyl, palmitoleyl, oleyl, linoleyl, linelenyl, erucyl, capryl, tallow, n-pentyl, any isopentyl, n-hexyl, any isohexyl, n-heptyl, any isoheptyl, n-octyl, any isooctyl, n-nonyl, any isononyl, n-decyl, any isodecyl, n-undecyl, any isoundecyl, n-dodecyl or lauryl, any isododecyl, n-tridecyl, any isotridecyl, n-tetradecyl, myristyl, any isotetradecyl, n-pentadecyl, any isopentadecyl, n-hexadecyl or cetyl, palmityl, any isohexadecyl, n-heptadecyl, any isoheptadecyl, n-octadecyl, stearyl, any isooctadecyl, n-nonadecyl, any isononadecyl, n-eicosyl, any isoeicosyl, n-henicosyl, any isohenicosyl, n-docosyl, any isodocosyl, n-tricosyl, any isotricosyl, n-tetracosyl, any isotetracosyl, n-pentacosyl, any isopentacosyl, n-hexacosyl, any isohexacosyl, n-heptacosyl, any isoheptacosyl, n-octacosyl, any isooctacosyl, n-nonacosyl, any isononacosyl, n-triacontyl, any isotriacontyl, n-hentriacontyl, any isohentriacontyl, n-dotriacontyl, any isodotriacontyl, n-tritriacontyl, any isotritriacontyl, n-tetratriacontyl, any isotetratriacontyl, n-pentatriacontyl, any isopentatriacontyl, n-hexatriacontyl, any isohexatriacontyl, n-heptatriacontyl, any isoheptatriacontyl, n-octatriacontyl, any isoocta-triacontyl, n-nonatriacontyl, any isononatriacontyl, n-tetracontyl, any isotetracontyl, n-hentetracontyl, any isohentetracontyl, n-dotetracontyl, any isodotetracontyl, n-tritetracontyl, any isotritetracontyl, n-tetratetracontyl, any isotetratetracontyl, n-pentatetracontyl, any isopentatetracontyl, n-hexatetracontyl, any isohexatetracontyl, n-heptatetracontyl, any isoheptatetracontyl, n-octatetracontyl, any isooctatetracontyl, n-nonatetracontyl, any isononatetracontyl, n-pentacontyl, isopentacontyl and mixtures thereof.

In certain embodiments, the $C_{\geq 3}$ hydrocarbon group is selected from the group consisting of 3-phenyl-3-ene-propyl, n-butyl, 6-ene-hexyl, n-octyl, n-hexadecyl, n-docosyl, and the mixture thereof.

The $C_{\geq 3}$ hydrocarbon group can be more specifically selected from the group consisting of n-dodecyl or lauryl, n-tridecyl, n-tetradecyl, myristyl, n-pentadecyl, n-hexadecyl or cetyl, palmityl, n-heptadecyl, n-octadecyl, and the mixture thereof.

The cationic unit of the cationic mediator may comprise a heterocyclic cation or an onium. Exemplary heterocyclic cations of the present invention may include, but are not limited to, imidazolium, 1-arylalkylimidazolium such as 1-benzyl-imidazolium, 1-alkylimidazolium such as 1-methylimidazolium, 1-arylalkyl-2-methyl-imidazolium such as 1-benzyl-2-methyl-imidazolium, 1-alkyl-2-methyl-imidazolium such as 1,2-dimethylimidazolium, 1,3-dialkylimidazolium, 1-arylalky-3-alkyl-imidazolium, 1,3-diarylalkylimidazolium, benzimidazolium, imidazolinium, pyridinium, piperidinium, pyrazinium, piperazinium, pyrrolium, pyrrolidinium, pyrazolium, diazolium, triazolium, pyridazinium, tetrazolium, amidinium, guanidinium, oxazolium, oxadiazolium, oxatriazolium, thiazolium, thiadiazolium, thiatriazolium, quaternary pyrazolidine, quaternary pyrrolidones, indolium, isoindolium, quinolinium, isoquinolinium, quinazolinium, quinoxalinium, derivates thereof, and mixture thereof.

The heterocyclic cation is selected from the group consisting of imidazolium, 1-arylalkylimidazolium such as 1-benzyl-imidazolium, 1-alkylimidazolium such as 1-methylimidazolium, 1-arylalkyl-2-methyl-imidazolium such as 1-benzyl-2-methyl-imidazolium, 1,3-dialkylimidazolium, 1-alkyl-2-methyl-imidazolium such as 1,2-dimethylimidazolium, 1-arylalky-3-alkyl-imidazolium, 1,3-diarylalkylimidazolium, and the like, and the mixture thereof.

The cationic mediators can have the formula (I) shown below:

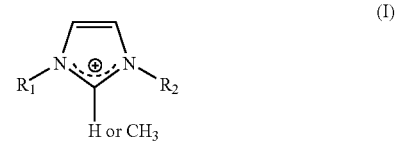

(I)

wherein at least one of $R_1$ and $R_2$ group is any of the $C_{\geq 3}$ hydrocarbon group, preferably a $C_{12}$-$C_{18}$ hydrocarbon group. In case only one of $R_1$ and $R_2$ groups is a $C_{\geq 3}$ hydrocarbon group, the other group may be any univalent group such as methyl or benzyl.

The cationic mediator can further comprise the following formula (I') compound, which is particularly effective in improving the gas barrier property of a polymeric product.

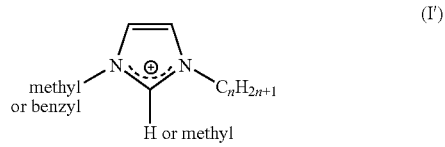

(I')

wherein n=12, 13, 14, 15, 16, 17 or 18.

In other exemplary embodiments, the cationic mediator of the invention may be selected from one or more of the following compounds:

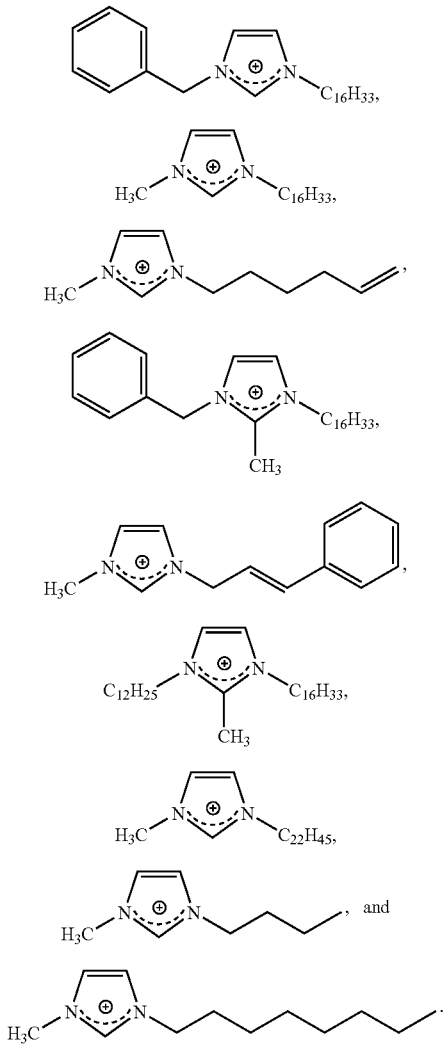

The cationic mediators may be prepared by reacting halogenated $C_{\geq 3}$ hydrocarbons with heterocyclic cation precursors. Examples of halogenated $C_{\geq 3}$ hydrocarbons include octyl chloride, hexadecyl chloride, 1-cinnamyl chloride, 6-chloro-1-hexene, 1-bromodocosane, 1-chlorobutane, and the like. Examples of heterocyclic cation precursors include 1-methylimidazole, 1-benzylimidazole, 1-benzyl-2-methylimidazole, 1,2-dimethylimidazole, 1-dodecyl-2-methyl imidazole, pyrazine, pyrazole, pyridazine, pyridine, imidazolidine, piperazine, piperidine, pyrazolidine, pyrrolidine, the derivatives thereof, and the mixtures thereof. Advantageously, several of these are environmentally friendly green solvents.

Typically, the preparation of these cationic mediators may be conducted at an elevated temperature, such as between about 23° C. to about 500° C., preferably between about 50° C. and about 180° C., more preferably between about 70° C. and about 100° C. During the preparation, the reactants may be mixed with vigorous stirring using e.g. a magnetic stirrer, under the protection of an inert gas such as nitrogen gas. In preferred embodiments, a halogenated $C_{\geq 3}$ hydrocarbon may be used to directly dissolve a heterocyclic cation precursor. For example, after heating 1-benzyl imidazole may be dissolved into 1-chlorohexadecane. Typically, the reaction time may last from 0.5 hours to 4 days, preferably from 0.5 day to 3 days, and most preferably from 0.5 days to 2 days. The resultant product may be washed with a suitable solvent such as ethyl acetate, toluene, and/or hexane, for one or more times, followed by vacuum drying at elevated temperature.

The cationic mediator of the invention may work alone or, optionally, in combination with one or more conventional surfactants, in exfoliating clay and forming the nano-composite. Some representative examples of conventional surfactants that can be used include methyl tallow bis-2-hydroxyethyl ammonium salt, dimethyl hydrogenated-tallow (2-ethylhexyl) ammonium salt, dimethyl benzyl hydrogenated-tallow ammonium salt, dimethyl dihydrogenated tallow ammonium salt, N-tallow alkyltrimethylenediamine, hydrogenated tallow amine, octadecylamine, octadecylamine and γ-aminopropyltriethoxy silane, polyoxyethylene decycloxypropylamine, n-dodecylpyrrolidone, or their combinations and analogs.

Examples of conventional surfactants include quaternary ammonium surfactants, such as dimethyl ditallow ammonium, trimethyl tallow ammonium, dimethyl dihydrogenated tallow ammonium, methyl ethyl ditallow ammonium, methyl ethyl benzyl tallow ammonium, dimethyl ethyl tallow ammonium, and the like. For example, dimethyl ditallow ammonium may be used first to treat mica, before the cationic mediator of the invention is used.

The cationic mediators can be used to exfoliate a layered material and form useful products such as a nano-composite, or organo-clay, or exfoliated clay, or intercalated clay. "Layered material" means an inorganic material that is in the form of a plurality of adjacent bound layers or plates. Typically, layered materials are those that can give at least one of the cationic mediators access to their interlayer spaces through exchanging, partially or completely, cations with the cationic mediators, a process called intercalation.

In many cases, the layered material is clay, which typically comprises an inorganic phase having layered materials in plates or other shapes with a significantly high aspect ratio. The aspect ratio is defined as the ratio of the largest and smallest dimension of the clay particles.

Exemplary clays include, but are not limited to, mica; synthetic mica; smectites such as montmorillonite (Bentonite), sodium montmorillonite, magnesium montmorillonite, calcium montmorillonite, beidellite, nontronite, hectorite, sodium hectorite, saponite, synthetic saponite, and sauconite; pyrophyllite; glauconites; vermiculites; polygorskines; sepiolites; allophanes; imogolites; talc; fluoro-mica; illites; glauconite; phyllosilicates; volkonskoite; sobockite; stevensite; svinfordite; magadiite; kenyaite; kaolinite; dickite; nacrite; anauxite; ledikite; montronite; silicate; halloysite; metahalloysite; sericite; allophone; serpentine clays; chrysotile; antigorite; attapulgite; sepiolite; palygorskite; Kibushi clay; gairome clay; hisingerite; chlorite; and the like; and mixtures thereof.

Clays may be untreated, or may have been chemically pretreated to make them more compatible with organic materials, as well as the cationic mediators of the invention. For example, a layered silicate clay may be modified with up to about 70 parts by weight of a quaternary ammonium salt surfactant selected from the group consisting of methyl tallow bis-2-hydroxyethyl ammonium halides, methyl tallow bis-2-hydroxyethyl ammonium alkyl sulfates, methyl tallow bis-2-hydroxyethyl ammonium nitrate, methyl tallow bis-2-hydroxyethyl ammonium hydroxide, methyl tallow bis-2-hydroxyethyl ammonium acetate, methyl tallow bis-2-hydroxyethyl ammonium phosphate, dimethyl hydrogenated-tallow (2-ethylhexyl) ammonium halides, dimethyl hydrogenated-tallow (2-ethylhexyl) ammonium alkyl sulfates, dimethyl hydrogenated-tallow (2-ethylhexyl) ammonium nitrate, dimethyl hydrogenated-tallow (2-ethylhexyl) ammonium hydroxide, dimethyl hydrogenated-tallow (2-ethylhexyl) ammonium acetate, dimethyl hydrogenated-tallow (2-ethylhexyl) ammonium phosphate, dimethyl dehydrogenated-tallow ammonium halides, dimethyl dehydrogenated-tallow ammonium alkyl sulfates, dimethyl dehydrogenated-tallow ammonium nitrate, dimethyl dehydrogenated-tallow ammonium hydroxide, dimethyl dehydrogenated-tallow ammonium acetate, and dimethyl dehydrogenated-tallow ammonium phosphate, among others.

In specific embodiments, mica from Coop Chemical Co. with a trade name ME100 is used as the clay in preparing nano-composites. The aspect ratio of this synthetic mica is over 1000, making it a preferred material for reducing gas permeability of rubber compounds.

In a variety of exemplary embodiments, the weight ratio between the clay and the cationic mediator can be from about 20:80 to about 80:20, preferably from about 40:60 to about 60:40.

The nano-composite comprises a clay and a cationic mediator, which is comprised of a hydrophobic unit and a cationic unit. The clay is exfoliated or intercalated by the cationic mediator.

Typical clays have a layered lamellar structure with a gap of about 0.1 nm between each layer and exchangeable cationic species such as $K^+$, $Na^+$ or $Ca^{2+}$ on the surface layer and between clay galleries or layers. The cationic species are attached by an ionic interaction with the negatively charged surface of the clay layers, and create a net neutral charge between clay layers.

To exfoliate or intercalate a clay, its lamellar structure is opened to some degree in order to permit the cation exchange reaction to take place with the cationic mediator of the invention. In a variety of embodiments, at least a portion of these exchangeable cationic species are substituted by the cationic mediator.

Any suitable clay exfoliation technique may be used to prepare the nano-composites of the invention. Exemplary clay-exfoliation techniques include, but are not limited to, direct addition method, and slurry method, among others. Direct addition techniques have been described in U.S. Pat. No. 5,334,241 and U.S. Pat. No. 5,616,286, the disclosures of which are incorporated herein by reference in its entirety.

In a slurry method, the clay may be first swelled in water. Swelling takes place because the cations of the clay become solubilized in the water. Presumably, the adjacent clay layers are repulsed by their similar negative charges, resulting in gaps between them. A cationic mediator may then be added to the swollen clay to form an organo-clay or nano-composite. Alternatively, before addition of the cationic mediator, the clay may be pre-exfoliated with a cationic surfactant such as an ammonium salt. In some embodiments, if the cationic mediator used is an ionic liquid, the clay may be directly mixed with the cationic mediator. The cationic mediator is attracted to the negatively charged surface of the clay, keeping the swelling state stable. Preferably, the exfoliated clay will have an average between-layer gap greater than about 0.1 nm, preferably greater than 1.0 nm, and more preferably greater than about 3.0 nm, such as about 5-10 nm. Then, a dewatering step may be taken to dry the exfoliated clay. Optionally, the dried exfoliated clay is washed with an alcohol, such as, but not limited to, isopropanol, propanol, butanol, hexanol, and the like, and the mixture thereof.

The present invention provides a composition comprising (i) a clay, (ii) a cationic mediator comprised of a hydrophobic unit and a cationic unit, and (iii) a polymer, wherein the clay is exfoliated or intercalated by the cationic mediator or by a mixture of the cationic mediator and the polymer.

When a polymer such as rubber is incorporated with the nano-composites the cationic mediator helps to form a relatively homologous morphology. Preferably, however not necessarily, the polymer will penetrate the clay layers and further separate the layers of the clay, based on the possibility that the added polymer and the cationic mediator can attract each other at, e.g., their hydrophobic portions. Preferably, the large molecule size of the cationic mediator and/or the added polymer may counteract any remaining Van der Waals interactions between the clay layers and the clay can be fully or almost fully exfoliated, i.e. separated into discrete layers.

Based on the total weight of the composition (clay+cationic mediator polymer), the amount of the nano-composite (clay+cationic mediator) may be from about 0.1% (wt) to about 90% (wt), preferably from about 1% (wt) to about 50% (wt), and more preferably from about 1% (wt) to about 30% (wt).

Based on the total weight of the composition, the amount of the polymer may be from about 99.9% (wt) to about 10% (wt), preferably from about 99% (wt) to about 50% (wt), and more preferably from about 99% (wt) to about 70% (wt).

Before the nano-composite (clay+cationic mediator) is added to the polymer in forming the composition, at least about 50% (wt) of the clay, preferably at least about 70% (wt) of the clay, and more preferably at least about 90% (wt) of the clay, is exfoliated. After the nano-composite is blended with the polymer at least about 50% (wt) of the clay, preferably at least about 70% (wt) of the clay, and more preferably at least about 90% (wt) of the clay, is exfoliated.

Before the nano-composite is blended with the polymer in forming the composition, the exfoliated clays may have an average between-layer gap greater than about 3 nm, preferably greater than 5 nm, and more preferably greater than about 10 nm. After the nano-composite is blended with the polymer in forming the composition, the exfoliated clays may have an average between-layer gap greater than about 3 nm, preferably greater than 7 nm, and more preferably greater than about 15 nm.

There is no specific limitation on suitable polymers. However, preferred polymers are those that can intercalate between clay layers more effectively with than without the aid of the cationic mediator as demonstrated above. The polymer can have a saturated or unsaturated polyvinyl-type (i.e., carbon-chain) backbone, such as polychloroprene, polyethylene, isobutene-isoprene rubber (butyl rubber, IIR), halogenated butyl rubber (HIIR) such as CIIR and BrIIR, neoprene rubber, nitrile rubber (NBR), 1,2-polybutadiene, polyallene, polybutadiene (butadiene rubber, BR), polyisobutylene (PIB), polyisoprene, 3,4-polyisoprene, poly(methyl acrylate), poly(methyl vinyl ketone), ethylene-propylene elastomer, polystyrene (PS), polyacrylamide, poly(acrylamide oxime), polypropylene (PP), styrene-butadiene rubber (SBR), poly(methyl methacrylate), acrylonitrile-butadiene-styrene terpolymer (ABS), poly(vinyl chloride) (PVC), poly(vinylidene chloride), poly(vinyl pyridine), poly(vinyl pyrolidone), poly(acrylic anhydride), polyacrylonitrile, styrene-acrylonitrile copolymer (SAN), ethylene-vinyl acetate copolymer (EVA), and the like. Of course, the polymer in the composition can possess a backbone with one or more functional groups such as carbonyl, or a non-carbon element such as N, S or O etc. (i.e. heterochain polymer). Exemplary heterochain polymers include, but are not limited to, polyether such as poly(oxyethylene), polyformadehyde, poly(phenylene oxide) or polyacetaldehyde; polyacrolein, polysulfide, polysulfone, poly(alkylene polysulfide), polyester, polycarbonate, polyphosphate ester, polyamide, polyurea, polyurethane, heterocyclic polymer, polyhydrazides, polyimide, melamine-formaldehyde resin (MF), polysaccharides, phenol-formaldehyde resin (PF), and polyanhydride etc. The polymer can also be an inorganic or inorganic/organic polymer such as polysiloxane, polysilane, carborane polymer, and organometallic polymer etc.

In a variety of exemplary embodiments, the composition of the invention may be used to manufacture articles such as tires. Rubber materials can be made by polymerization or copolymerization of a wide range of monomers, which include, but are not limited to, conjugated dienes such isoprene, butadiene, and the like; alkyl acrylates such as methyl acrylate, ethyl acrylate, butyl acrylate, methyl methacrylate, and the like; vinylidene monomers having one or more terminal vinyl groups; vinyl aromatics such as styrene, α-methylstyrene, t-butylstyrene, bromostyrene, chlorostyrene, fluorostyrene, and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide, and the like.

In some embodiments, vinyl aromatic monomers are incorporated into polydiene rubbers. Such vinyl aromatic monomers are selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. Some examples of vinyl aromatic monomers that can be utilized include styrene, 1-vinylnaphthalene, 2-vinylnaphthalene, α-methylstyrene, 4-phenylstyrene, 3-methylstyrene, t-butylstyrene, and the like.

In a variety of exemplary embodiments, the polymer may be synthesized by emulsion polymerization, solution polymerization, vapor phase polymerization or bulk polymerization. The polymerization process can be conducted as a batch, semi-continuous, or continuous process. Examples of useful rubber materials include butyl rubber, epichlorohydrin rubber, natural rubber, isoprene rubber, chloroprene rubber, styrene rubber, nitrile rubber, ethylene-propylene rubber, ethylene-propylene-diene rubber, butadiene rubber, styrene-butadiene rubber, acrylic rubber, urethane rubber, fluoro rubber and silicone rubber, among others.

The invention also provides a process for making a rubber article such as tire comprising the steps of (1) kneading (a) a polymer; (b) a nano-composite as described above; and (c) conventional rubber compounding ingredients to produce a mixture; (2) forming an article from the mixture; and (3) vulcanizing the article.

Conventional rubber compounding ingredients may be selected from the group consisting of curing agents, cure accelerators, cure activators, curing aids such as sulfur, processing aids, conventional fillers, fatty acid, zinc oxide, waxes, reinforcing agents, oils, cure retarders, resins including tackifying resins, peptizing agents, extenders, stabilizers, plasticizers, antidegradants, antioxidants, antiozonants, pigments, fragrances, and the mixture thereof.

Specific examples of useful antioxidants and stabilizers include 2-(2'-hydroxy-5'-methylphenyl) benzotriazole, nickel di-butyl-di-thiocarbamate, tris(nonylphenyl)phosphite, 2,6-di-t-butyl-4-methylphenol, and the like. Other representative antioxidants may be, for example, diphenyl-p-phenylenediamine and those disclosed in *The Vanderbilt Rubber Handbook*(1978), Pages 344 through 346.

Exemplary fillers and pigments include silica, carbon black, titanium dioxide, iron oxide, and the like. In some embodiments, it will be beneficial to utilize a combination of silica and carbon black as the filler. It is to be appreciated that the silica coupler may be used in conjunction with a carbon black (namely, pre-mixed with a carbon black prior to addition to the composition). Talc can also be included as a portion of the filler to reduce cost.

Suitable reinforcing materials are inorganic or organic products of high molecular weight. Examples include glass fibers, asbestos, boron fibers, carbon and graphite fibers, whiskers, quartz and silica fibers, ceramic fibers, metal fibers, natural organic fibers, and synthetic organic fibers. Suitable processing aids can include, for example, aromatic, napthenic, and/or paraffinic processing oils. Suitable types of accelerators that may be used in the present invention are amines, disulfides, guanidines, thioureas, thiazoles, thiurams, sulfenamides, dithiocarbamates and xanthates.

The kneading may be conducted in a bulk thermomechanical mixer at a temperature within the range of from about 25° C. to about 250° C., preferably from about 50° C. to about 200° C., more preferably from about 70° C. to about 180° C.

In one embodiment, the nano-composite can be incorporated into butyl rubber by any method known to a skilled artisan, for example, wet/solvent method or a dry mixing method under mild mixing conditions. Such mild mixing conditions are similar to those normally used in butyl rubber mixing. The mixing may be accomplished, for example, by using any integral mixing device such as a Brabender mixer, a twinscrew extruder or a kneader, at a mixing rate of from about 20 to about 200 rpm, at a temperature of about 25° C. to about 250° C. for a period of about 3~30 minutes. The mixing conditions for example include mixing in a Brabender mixer at about 60 rpm at a temperature of about 70° C. for about three minutes. The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur.

The polymer composition can be used in tire treads in conjunction with ordinary tire manufacturing techniques. After the tire has been built, it can be vulcanized using a normal tire cure cycle. Tires made in accord with this invention can be cured over a wide temperature range. However, it is generally preferred for the tires of this invention to be cured at a temperature ranging from about 100° C. to about 250° C. It is generally preferred for the cure cycle used to vulcanize the tire to have a duration of about 5 minutes to about 60 minutes with a cure cycle of about 10 minutes to about 40 minutes being preferred.

Experimentation has shown occurrences of improved tensile strength, gas permeability, and cure properties including cure capability and cure time etc. for various rubber compounds including the nano-composite of the present invention.

In one embodiment, the present compounds can be used for tire inner liners, sidewall, tread rubber, hose and containers.

The technology can provide good cure systems and low gas permeability materials as well as BR-IIR. In some exemplary embodiments, the butyl rubber composition is useful in the formation of inner liners for automobile tires and in applications requiring good damping characteristics, such as engine mounts. Other uses for the butyl rubber include use in air cushions, pneumatic springs, air bellows, accumulator bags, tire-curing bladders, high temperature service hoses, and conveyor belts for handling hot materials.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Example 1

The synthesis of 1-benzyl-3-hexadecyl imidazolium chloride (C16-bim)

103 g of 1-benzylimidazole (Aldrich) and 170 g of 1-chlorohexadecane were added into a 2000 ml three-neck round-bottom flask. A refluxing/cooling condenser was set on the left neck. A thermometer was set on the right neck. A rubber stopper was set on the middle neck. Nitrogen gas was breathed into the liquid phase through the needle from the middle neck. The reactants were mixed with vigorous stirring using a magnetic stirrer. Temperature was kept between 70° C. and 80° C. After heating up, 1-benzyl imidazole dissolved into 1-chlorohexadecane. The solution in the flask turned into red brown solution. The reaction was continued for three days. Then, the product was cooled down. The white product came out of the solution. The product was washed with ethyl acetate five times. After that, it was dried in vacuum for seven hours at about 50° C.

Example 2

The synthesis of 1-methyl-3-hexadecyl imidazolium chloride (C16-mim)

The procedure of Example 1 was repeated with minor changes. 868 g of 1-chlorohexadecane and 570 g of 1-methylimidazole were added into a 2000 ml three-neck round-bottom flask. The reaction temperature was set from 95 to 100° C. After four hours the milk-like solution transferred into homogenous solution. The reaction was continued for three days. Then, the product was washed with ethyl acetate five times and toluene three times. After that, it was dried under vacuum for three days.

Example 3

The synthesis of 1-methyl-3-5-hexenyl imidazolium chloride (2-C6 mim)

The procedure of Example 1 was repeated with minor changes. 51.0 g of 6-chloro-1-hexene (Aldrich) and 35.3 g of 1-methylimidazole (Aldrich) were added into a 2000 ml three-neck round-bottom flask. The reaction temperature was set from 75 to 80° C. After four hours the milk-like solution transferred into a homogenous solution. The reaction was continued for three days. Then, the product was washed with ethyl acetate five times. After that, it was dried under vacuum for three days.

Example 4

The synthesis of 1-benzyl-2-methyl-3-hexadecyl imidazolium chloride (C16-bmim)

The procedure of Example 1 was repeated with minor change. 427 g of 1-chlorohexadecane (Aldrich) and 280 g of 1-benzyl-2-methyl imidazole (Shikoku Chemicals Corp. 1B2MZ) were added into a 2000 ml three-neck round-bottom flask. The reaction temperature was set from 75 to 80° C. After four hours the milk-like solution transferred into a homogenous solution. The reaction was continued for four days. Then, the product was washed with ethyl acetate five times. After that, it was dried under vacuum for three days.

Example 5

The synthesis of 1-methyl-3-cinnamyl imidazolium chloride

The procedure of Example 1 was repeated with minor changes. 199 g of 1-cinnamyl chloride (Acros) and 108 g of 1-methyl imidazole (Aldrich) was added into a 2000 ml three-neck round-bottom flask. The reaction temperature was set from 75 to 80° C. After one hour, the gel appeared. The reaction was continued for four days. Then, the product was washed with ethyl acetate three times. After that, it was dried under vacuum for three days.

Example 6

The synthesis of 1-dodecyl-2-methyl-3-hexadecyl chloride (C12C16-mim)

The procedure of Example 1 was repeated with minor changes. 269 g of 1-chlorohexadecene (Aldrich) and 256 g of 1-dodecyl-2-methyl imidazole (Shikoku Chemicals Corp. SZ) were added into a 2000 ml three-neck round-bottom flask. The reaction temperature was set from 75 to 80° C. After seven days a white product appeared. The reaction was continued for ten days. Then, the product was washed with toluene two times and n-hexane three times. After that, it was dried in vacuum for three days.

Example 7

The synthesis of 1-methyl-3-docosanyl bromide (C22-mim)

The procedure of Example 1 was repeated with minor changes. 311 g of 1-bromodocosane (Aldrich) and 67 g of 1-methyl imidazole (Aldrich) were added into a 2000 ml three-neck round-bottom flask. The reaction temperature was set from 75 to 80° C. After a day, a black product appeared. The reaction was continued for three days. Then, the product was washed with n-hexane five times. After that, it was dried in vacuum for three days.

Example 8

The synthesis of 1-methyl-3-butyl imidazolium chloride (C4-mim)

The procedure of Example 1 was repeated with minor changes. 549 g of 1-chlorobutane and 487 g of 1-methylimidazole were added into a 2000 ml three-neck round-bottom flask. The reaction temperature was set from 75 to 80° C. After four hours, the milk-like solution transferred into homogenous solution. The reaction was continued for three days. Then, the product was washed with ethyl acetate five times. After that, it was dried in vacuum for three days.

Example 9

The synthesis of 1-methyl-3-octyl imidazolium chloride (C8-mim)

The procedure of Example 1 was repeated with minor changes. 654 g of 1-chlorooctane and 360 g of 1-methylimidazole were added into a 2000 ml three-neck round-bottom flask. The reaction temperature was set from 75 to 80° C. After four hours, the milk-like solution transferred into homogenous solution. After two days, 60 g of 1-chlorooctane was added into the reactor. The reaction was continued for three days. Then, the product was washed with ethyl acetate five times and toluene three times. After that, it was dried in vacuum for three days.

Preparation of Organo-Mica

Example A 80 g of the product from Example 1, 40 g of ME100 (Coop Chemical, Co.) and 800 g of deionized water were mixed together in a bottle and tumbled overnight. The solution was filtered and the treated mica was collected. Then, it was dried in vacuum. TGA analysis showed that the treated mica contained 50.31% of the inorganic residue.

Example B 80 g of the product from Example 2, 40 g of ME100 (Coop Chemical, Co.) and 800 g of deionized water were mixed together in a bottle and tumbled overnight. The solution was filtered and the treated mica was collected. Then, it was dried in vacuum. TGA analysis showed that the treated mica contained 48.57% of the inorganic residue.

Example C 44 g of Example A and 600 g of isopropanol were mixed together in a bottle and tumbled for four hours. The solution was filtered and the treated mica was collected. Then, it was dried in vacuum. TGA analysis showed that the treated mica contained 68.34% of inorganic residue.

Example D (C16-mim)

60 g of Example B and 600 g of isopropanol were mixed together in a bottle and tumbled for four hours. The solution was filtered, and the treated mica was collected. Then, it was dried in vacuum. TGA analysis showed that the treated mica contained 68.89% of inorganic residue.

Example E 80 g of the product from Example 8, 40 g of ME100 (Coop Chemical, Co.) and 800 g of deionized water were mixed together in a bottle and tumbled overnight. The solution was filtered, and the treated mica was collected. Then, it was dried in vacuum. TGA analysis showed that the treated mica contained 85.06% of the inorganic residue.

Example F 80 g of the product from Example 9, 40 g of ME100 (Coop Chemical, Co.) and 800 g of deionized water were mixed together in a bottle and tumbled overnight. The solution was filtered, and the treated mica was collected. Then, it was dried in vacuum. TGA analysis showed that the treated mica contained 79.38% of the inorganic residue.

Example G 80 g of the product from Example 3, 40 g of ME100 (Coop Chemical, Co.) and 800 g of deionized water were mixed together in a bottle and tumbled overnight. The solution was filtered, and the treated mica was collected. Then, it was dried in vacuum. TGA analysis showed that the treated mica contained 84.25% of the inorganic residue.

Example H 300 g of the product from Example 4, 150 g of ME100 (Coop Chemical, Co.) and 3000 g of deionized water were mixed together in a bottle and tumbled overnight. The solution was filtered and the treated mica was collected. Then, about 300 g of the treated mica containing water and 2000 g of isopropanol were mixed together and tumbled for four hours. Then, the solution was filtered, and the treated mica was collected. After that, it was dried in vacuum. TGA analysis showed that the treated mica contained 67.05% of the inorganic residue.

Example I 300 g of the 1-benzyl-2-methyl-3-dodecyl imidazolium chloride (Shikoku Chemicals Corp. SFZ), 150 g of ME100 (Coop Chemical, Co.) and 3000 g of deionized water were mixed together in a bottle and tumbled overnight. The solution was filtered, and the treated mica was collected. Then, about 300 g of the treated mica containing water and 2000 g of isopropanol were mixed together and tumbled for four hours. Then the solution was filtered, and the treated mica was collected. After that, it was dried in vacuum. TGA analysis showed that the treated mica contained 70.01% of the inorganic residue.

Example J 300 g of the Cetyl pyridimium chloride, 150 g of ME100 (Coop Chemical, Co.) and 3000 g of deionized water were mixed together in a bottle and tumbled overnight. The solution was filtered, and the treated mica was collected. Then, about 300 g of the treated mica containing water and 2000 g of isopropanol were mixed together and tumbled for four hours. Then the solution was filtered, and the treated mica was collected. After that, it was dried in vacuum. TGA analysis showed that the treated mica contained 70.94% of the inorganic residue.

Example K 30 g of the product from Example 5, 100 g of ME100 (Coop Chemical, Co.) and 3000 g of deionized water were mixed together in a bottle and tumbled overnight. The solution was filtered, and the treated mica was collected. Then, about 200 g of the treated mica containing water and 2000 g of isopropanol were mixed together and tumbled for four hours. Then the solution was filtered and the treated mica was collected.

After that, it was dried in vacuum. TGA analysis showed that the treated mica contained 84.05% of the inorganic residue.

Example L 300 g of the product from Example 6, 150 g of ME100 (Coop Chemical, Co.) and 3000 g of deionized water were mixed together in a bottle and tumbled overnight. The solution was filtered, and the treated mica was collected. Then, about 250 g of the treated mica containing water and 2000 g of isopropanol were mixed together and tumbled for four hours. Then the solution was filtered, and the treated mica was collected. After that, it was dried in vacuum. TGA analysis showed that the treated mica contained 64.03% of the inorganic residue.

Example M 57 g of the product from Example 7, 100 g of ME100 (Coop Chemical, Co.) and 3000 g of deionized water were mixed together in a bottle and tumbled overnight. The solution was filtered, and the treated mica was collected. Then, about 800 g of the treated mica containing water and 1700 g of isopropanol were mixed together and tumbled for four hours. Then the solution was filtered, and the treated mica was collected. After that, it was dried in vacuum. TGA analysis showed that the treated mica contained 63.63% of the inorganic residue.

Example N 56 g of the 1,3-dibenzyl-2-methyl imidazolium chloride (Shikoku Chemicals Corp. DB2MZ-CI), 100 g of ME100 (Coop Chemical, Co.) and 3000 g of deionized water were mixed together in a bottle and tumbled overnight. The solution was filtered, and the treated mica was collected. Then, about 400 g of the treated mica containing water and 2000 g of isopropanol were mixed together and tumbled for four hours. Then the solution was filtered, and the treated mica was collected. After that, it was dried in vacuum. TGA analysis showed that the treated mica contained 83.34% of the inorganic residue.

Rubber Mixing

Compounds A-F were prepared according to the formulation and the mixing conditions shown at Tables 1 and 2. Results were summarized at Table 3.

TABLE 1

|  | Comp. A | Comp. B | Comp. C | Comp. D | Comp. E | Comp. F |
|---|---|---|---|---|---|---|
| Treated mica | Ex. A | Ex. B | Ex. C | Ex. D | ME100 | — |
| Amount of treated mica (g) | 12.99 | 13.33 | 10.26 | 10.20 | 7.50 | — |
| Amount of Br-IIR (g) | 37.01 | 36.67 | 39.74 | 39.80 | 42.50 | 50.00 |
| Remill stock (g) | 46.81 | 46.84 | 46.59 | 46.59 | 46.37 | 45.79 |
| Cure Packages (g) |  |  |  |  |  |  |
| Accelerator (DM)* | 0.69 | 0.69 | 0.74 | 0.74 | 0.79 | 0.92 |
| Sulfur | 1.04 | 1.03 | 1.11 | 1.11 | 1.18 | 1.37 |
| Stearic Acid | 0.62 | 0.62 | 0.67 | 0.67 | 0.71 | 0.82 |
| Zinc Oxide | 0.83 | 0.82 | 0.89 | 0.89 | 0.95 | 1.10 |

*Altx-MBTS; Comp. means compound; Ex. means Example

TABLE 2

| mixing conditions | |
|---|---|
| Mixer: 65 g Brabender | Rotation Speed: 60 rpm |
| Master batch stage | |
| Initial temperature | 70° C. |
| 0.0 min | charging polymers |
| 0.5 min | charging treated mica |
| 3.0 min | drop |
| Remill stage | |
| Initial temperature | 70° C. |
| 0.0 min | charging master stocks |
| 3.0 min | drop |
| Final batch | |
| Initial temperature | 70° C. |
| 0.0 min | charging remill stocks |
| 0.5 min | charging cure packages |
| 2.0 min | drop |

After sheeting, rubber compounds were cured for 30 minutes at 165° C. Gas permeability was measured at 100° C. by GTR-30ABS (GTR TEK Co LTD). Freon gas (F-134a) was used as test gas.

TABLE 3

|  | Comp. A | Comp. B | Comp. C | Comp. D | Comp. E ref | Comp. F ref |
|---|---|---|---|---|---|---|
| Treated mica | Ex. A | Ex. B | Ex. C | Ex. D | ME100 | — |
| Inorganic content (wt %) by TGA | 50.31 | 48.57 | 68.34 | 68.89 | 100 | — |
| Cure Capability($S_{max} - S_{min}$)(kg-cm) | 2.63 | 2.35 | 3.61 | 4.02 | 2.68 | 2.14 |
| $T_{0.1}$ (10% cure time; min) | 1.86 | 1.13 | 2.46 | 2.22 | 2.06 | 1.96 |
| $T_{0.9}$ (90% cure time; min) | 10.59 | 16.40 | 14.68 | 19.32 | 19.88 | 16.98 |
| Ring tensile |  |  |  |  |  |  |
| 35% Md (Mpa) | 0.349 | 0.450 | 0.571 | 0.753 | 0.145 | 0.099 |
| Tb (MPa) | 4.462 | 7.840 | 6.070 | 5.464 | 4.192 | 2.847 |
| Eb (%) | 865.2 | 1038.6 | 787.9 | 713.8 | 917.6 | 851.1 |
| Gas permeability index |  |  |  |  |  |  |
| GPI to pure rubber | 1.02 | 0.94 | 0.40 | 0.43 | 0.76 | 1.00 |

Comp. means compound; Ex. means Example.

Experimental results shown at Table 3 indicated that the excess surfactants affected badly to gas permeability, cure properties and ring tensile.

Compounds G-N were prepared according to the formulation and the mixing conditions shown at Tables 2, 4 and 5. Results were summarized at Tables 6, 7 and FIG. 1. FIG. 1 shows the relationship between the gas permeability indexes (GPI) of the rubbery compositions versus the carbon numbers of the chains in some imidazolium compounds.

TABLE 4

|  | Comp. G | Comp. H | Comp. I | Comp. J | Comp. K | Comp. L |
|---|---|---|---|---|---|---|
| Treated mica | Ex. E | Ex. F | Ex. G | Ex. H | Ex. I | Ex. J |
| Amount of treated mica (g) | 8.59 | 9.10 | 8.66 | 10.42 | 10.07 | 9.96 |
| Amount of Br-IIR (g) | 41.41 | 40.90 | 41.34 | 39.58 | 39.93 | 40.04 |
| Remill stock (g) | 46.46 | 46.50 | 46.47 | 46.61 | 46.58 | 46.57 |
| Cure Packages (g) | | | | | | |
| Accelerator (DM)* | 0.77 | 0.76 | 0.77 | 0.74 | 0.74 | 0.75 |
| Sulfur | 1.15 | 1.14 | 1.15 | 1.11 | 1.12 | 1.12 |
| Stearic Acid | 0.69 | 0.68 | 0.69 | 0.66 | 0.67 | 0.67 |
| Zinc Oxide | 0.92 | 0.91 | 0.92 | 0.89 | 0.89 | 0.89 |

*Altx-MBTS; Comp. means compound; Ex. means Example

TABLE 5

|  | Comp. M | Comp. N | Comp. O | Comp. P | Comp. I |
|---|---|---|---|---|---|
| Treated mica | Ex. K | Ex. L | Ex. M | Ex. N | MAE |
| Amount of the treated mica (g) | 8.68 | 10.80 | 10.86 | 8.74 | 11.63 |
| Amount of Br-IIR (g) | 41.32 | 39.20 | 39.14 | 41.26 | 38.37 |
| Remill stock (g) | 46.47 | 46.64 | 46.64 | 46.47 | 46.70 |
| Cure Packages (g) | | | | | |
| Accelerator (DM)* | 0.77 | 0.73 | 0.73 | 0.77 | 0.72 |
| Sulfur | 1.15 | 1.10 | 1.10 | 1.15 | 1.08 |
| Stearic Acid | 0.69 | 0.60 | 0.66 | 0.69 | 0.65 |
| Zinc Oxide | 0.92 | 0.88 | 0.88 | 0.92 | 0.86 |

*Altx-MBTS; Comp. means compound; Ex. means Example; MAE (produced by Coop Chemical Co.); MAE corresponds to ME100 treated with dimethyl ditallow ammonium.

TABLE 6

|  | Comp. C | Comp. D | Comp. G | Comp. H | Comp. I | Comp. J | Comp. K |
|---|---|---|---|---|---|---|---|
| Treated mica | Ex. C | Ex. D | Ex. E | Ex. F | Ex. G | Ex. H | Ex. I |
| Inorganic content (wt %) by TGA | 68.34 | 68.89 | 85.06 | 79.38 | 84.25 | 67.05 | 70.01 |
| Cure Capability ($S_{max} - S_{min}$)(kg-cm) | 3.61 | 4.02 | 3.38 | 3.10 | 3.74 | 3.06 | 2.81 |
| $T_{0.1}$ (10% cure time; min) | 2.46 | 2.22 | 2.66 | 2.90 | 2.43 | 2.42 | 2.4 |
| $T_{0.9}$ (90% cure time; min) | 14.68 | 19.32 | 22.03 | 27.39 | 17.73 | 12.86 | 11.87 |
| Ring tensile | | | | | | | |
| 35% Md (Mpa) | 0.571 | 0.753 | 0.160 | 0.195 | 0.168 | 0.629 | 0.626 |
| Tb (MPa) | 6.070 | 5.464 | 4.016 | 3.561 | 3.213 | 4.809 | 5.414 |
| Eb (%) | 787.9 | 713.8 | 854.4 | 782.5 | 698.6 | 719.3 | 742.2 |
| Gas permeability index | | | | | | | |
| GPI to pure rubber | 0.40 | 0.43 | 0.72 | 0.70 | 0.74 | 0.42 | 0.39 |

Comp. means compound; Ex. means Example

TABLE 7

|  | Comp. L | Comp. M | Comp. N | Comp. O | Comp. P |
|---|---|---|---|---|---|
| Treated mica | Ex. J | Ex. K | Ex. L | Ex. M | Ex. N |
| Inorganic content (wt %) by TGA | 70.94 | 84.05 | 64.03 | 63.63 | 83.34 |
| Cure Capability ($S_{max} - S_{min}$)(kg-cm) | 3.10 | 3.01 | 2.60 | 2.83 | 3.19 |
| $T_{0.1}$ (10% cure time; min) | 1.88 | 2.37 | 2.20 | 1.54 | 2.19 |
| $T_{0.9}$ (90% cure time; min) | 20.4 | 23.4 | 12.24 | 14.06 | 19.05 |
| Ring tensile | | | | | |
| 35% Md (Mpa) | 0.802 | 0.17 | 0.48 | 0.38 | 0.16 |
| Tb (MPa) | 7.413 | 3.16 | 6.42 | 8.20 | 3.69 |
| Eb (%) | 924.1 | 858.8 | 855.5 | 998.2 | 924.2 |
| Gas permeability index | | | | | |
| GPI to pure rubber | 0.49 | 0.69 | 0.60 | 0.85 | 0.78 |

Comp. means compound; Ex. means Example

Example 10

The synthesis of 1-benzyl-3-hexadecanyl imidazolium chloride 103 g of 1-benzylimidazole (Aldrich) and 170 g of 1-chlorohexadecane were added into a 2000 ml three-neck round-bottom flask. A refluxing/cooling condenser was set on the left neck. A thermometer was set on the right neck. A rubber stopper was set on the middle neck. Nitrogen gas was breathed into the liquid phase through the needle from the middle neck. The reactants were mixed with vigorous stirring using a magnetic stirrer. Temperature was kept between 70 and 80° C. After heating up, 1-benzyl imidazole dissolved into 1-chlorohexadecane. The solution in the flask turned into red brown solution. The reaction was continued for three days. Then, the product was cooled down. The white product came out the solution. The product was washed with ethylacetate five times. After that, it was dried in vacuum for seven hours at about 50° C.

Example 11

The synthesis of 1-dodecyl-2-methyl-3-hexadecyl chloride (C12C16-mim)

The procedure of Example 10 was repeated with minor changes. 269 g of 1-chlorohexadecene (Aldrich) and 256 g of 1-dodecyl-2-methyl imidazole (Shikoku Chemicals Corp. SZ) were added into a 2000 ml three-neck round-bottom flask. The reaction temperature was set from 75 to 80° C. After seven days, a white product appeared. The reaction was continued for ten days. Then, the product was washed with toluene two times and n-hexane three times. After that, it was dried in vacuum for three days.

Example 12

The synthesis of 1-methyl-3-docosanyl bromide (C22-mim)

The procedure of Example 10 was repeated with minor changes. 311 g of 1-bromodocosane (Aldrich) and 67 g of 1-methyl imidazole (Aldrich) were added into a 2000 ml three-neck round-bottom flask. The reaction temperature was set from 75 to 80° C. After a day, a black product appeared. The reaction was continued for three days. Then, the product was washed with n-hexane five times. After that, it was dried in vacuum for three days.

Preparation of Organo-Mica

Example O 100 g of the product from Example 10, 50 g of ME100 (Coop Chemical, Co.) and 1000 g of deionized water were mixed together in a bottle and tumbled overnight. The solution was filtered, and the treated mica was collected. Then, about 240 g of the treated mica containing water and 2000 g of isopropanol were mixed together and tumbled for four hours. Then the solution was filtered, and the treated mica was collected. After that, it was dried in vacuum. TGA analysis showed that the treated mica contained 67.13% of the inorganic residue.

Example P 300 g of the product from Example 11, 150 g of ME100 (Coop Chemical, Co.) and 3000 g of deionized water were mixed together in a bottle and tumbled overnight. The solution was filtered, and the treated mica was collected. Then, about 250 g of the treated mica was collected. Then, about 250 g of the treated mica containing water and 2000 g of isopropanol were mixed together and tumbled for four hours. Then the solution was filtered, and the treated mica was collected. After that, it was dried in vacuum. TGA analysis showed that the treated mica contained 64.03% of the inorganic residue.

Example Q 56 g of the 1,3-dibenzyl-2-methyl imidazolium chloride (Shikoku Chemicals Corp. DB2MZ-CI), 100 g of ME100 (Coop Chemical, Co.) and 3000 g of deionized water were mixed together in a bottle and tumbled overnight. The solution was filtered, and the treated mica was collected. Then, about 400 g of the treated mica containing water and 2000 g of isopropanol were mixed together and tumbled for four hours. Then the solution was filtered, and the treated mica was collected. After that, it was dried in vacuum. TGA analysis showed that the treated mica contained 83.34% of the inorganic residue.

Example R 57 g of the product from Example 12, 100 g of ME100 (Coop Chemical, Co.) and 3000 g of deionized water were mixed together in a bottle and tumbled overnight. The solution was filtered and the treated mica was collected. Then, about 800 g of the treated mica containing water and 1700 g of isopropanol were mixed together and tumbled for four hours. Then the solution was filtered, and the treated mica was collected. After that, it was dried in vacuum. TGA analysis showed that the treated mica contained 63.63% of the inorganic residue.

Rubber Mixing

Compounds O-U were prepared according to the formulation and the mixing conditions shown at Tables 8 and 9. Results were summarized at Table 10.

TABLE 8

|  | Comp. O | Comp. P | Comp. Q | Comp. R | Comp. S | Comp. T | Comp. U |
|---|---|---|---|---|---|---|---|
| Treated mica | Ex. O | Ex. P | Ex. Q | Ex. R | MAE | ME100 | — |
| Amount of treated mica (g) | 10.41 | 10.80 | 8.74 | 10.86 | 11.63 | 7.50 | — |
| Amount of Exxpro3745 (g) | 39.59 | 39.20 | 41.26 | 39.14 | 38.37 | 42.50 | 50.00 |
| Remill stock (g) | 47.73 | 47.75 | 47.64 | 47.76 | 47.80 | 47.57 | 47.17 |
| Cure Packages (g) |  |  |  |  |  |  |  |
| Accelerator (TT) | 0.38 | 0.37 | 0.39 | 0.37 | 0.37 | 0.40 | 0.47 |
| Zinc Oxide | 1.89 | 1.87 | 1.97 | 1.87 | 1.83 | 2.02 | 2.36 |

*Altx-MBTS; Comp. means compound; Ex. means Example; Exxpro 3745 was produced by Exxon Mobil Corp.
MAE was produced by Coop Chemical Co. MAE corresponds to ME100 treated with dimethyl ditallow ammonium.

TABLE 9

| mixing conditions | |
|---|---|
| Mixer: 65 g Brabender | Rotation Speed: 60 rpm |
| Master batch stage | |
| Initial temperature | 70° C. |
| 0.0 min | charging polymers |

TABLE 9-continued

| mixing conditions | |
|---|---|
| Mixer: 65 g Brabender | Rotation Speed: 60 rpm |
| 0.5 min | charging treated mica |
| 3.0 min | drop |
| Remill stage | |
| Initial temperature | 70° C. |
| 0.0 min | charging master stocks |
| 3.0 min | drop |
| Final batch | |
| Initial temperature | 70° C. |
| 0.0 min | charging remill stocks |
| 0.5 min | charging cure packages |
| 2.0 min | drop |

After sheeting, rubber compounds were cured for 30 mins. at 165° C. Gas permeability was measured at 100° C. by GTR-30ABS (GTR TEK Co LTD). Freon gas (F-134a) was used as test gas.

TABLE 10

| | Comp. O | Comp. P | Comp. Q | Comp. R | Comp. S ref | Comp. T ref | Comp. U ref |
|---|---|---|---|---|---|---|---|
| Treated mica | Ex. O | Ex. P | Ex. Q | Ex. R | MAE | ME100 | — |
| Inorganic content (wt %) by TGA | 67.69 | 64.03 | 83.34 | 63.63 | 58.22 | 100 | — |
| Cure Capability($S_{max} - S_{min}$)(kg-cm) | 3.85 | 3.92 | 7.07 | 3.77 | 2.87 | 6.91 | 6.28 |
| $T_{0.1}$ (10% cure time; min) | 1.66 | 1.58 | 1.11 | 1.37 | 2.54 | 1.03 | 0.10 |
| $T_{0.9}$ (90% cure time; min) | 32.24 | 23.29 | 7.38 | 27.80 | 33.18 | 6.92 | 10.53 |
| Ring tensile | | | | | | | |
| 35% Md (Mpa) | 0.87 | 0.62 | 0.26 | 0.85 | 1.619 | 0.21 | 0.17 |
| Tb (MPa) | 5.25 | 4.86 | 2.09 | 6.28 | 8.47 | 1.53 | 1.02 |
| Eb (%) | 385.8 | 1038.57 | 854.40 | 782.47 | 335.7 | 197.3 | 168.9 |
| Gas permeability index | | | | | | | |
| GPI to pure rubber | 0.44 | 0.63 | 0.87 | 0.81 | 0.54 | 0.67 | 1.00 |

Comp. means compound; Ex. means Example

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and publications cited herein are incorporated herein by reference.

The invention claimed is:
1. A nano-composite comprising
   (i) a clay, and
   (ii) a cationic mediator comprised of a hydrophobic unit and a cationic unit, the cationic mediator comprising one of the following compounds:

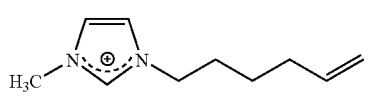
(I-3)

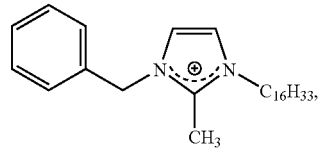
(I-4)

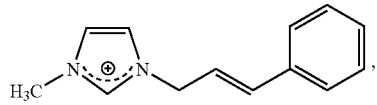
(I-5)

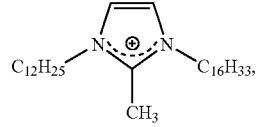
(I-6)

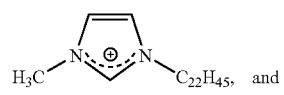
(I-7)

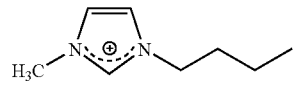
(I-8)

wherein the clay is exfoliated or intercalated by the cationic mediator.

2. The nano-composite according to claim 1, wherein the cationic mediator is accompanied by a counter ion selected from the group consisting of $Cl^-$, $Br^-$, $F^-$, $I^-$, $O^{2-}$, $S^{2-}$, $Se^{2-}$, $Te^{2-}$, $N_3^-$, $As_3^-$, $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^{3-}$, $NO_2^-$, $NO_3^-$, $C_2O_4^{2-}$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_2^-$, $ClO_3^-$, $ClO_4^-$, $BrO^-$, $BrO_2^-$, $BrO_3^-$, $BrO_4^-$, $IO^-$, $IO_2^-$, $IO_3^-$, $IO_4^-$, and the mixture thereof.

3. The nano-composite according to claim 1, further comprising a conventional surfactant selected from the group consisting of methyl tallow bis-2-hydroxyethyl ammonium salt, dimethyl hydrogenated-tallow (2-ethylhexyl) ammonium salt, dimethyl benzyl hydrogenated-tallow ammonium salt, dimethyl dihydrogenated tallow ammonium salt, N-tallow alkyltrimethylenediamine, hydrogenated tallow amine, octadecylamine, γ-aminopropyltriethoxy silane, polyoxyethylene decycloxypropylamine, n-dodecylpyrrolidone, and the mixture thereof.

4. The nano-composite according to claim 1, further comprising a quarternary ammonium surfactant selected from the group consisting of dimethyl ditallow ammonium, trimethyl tallow ammonium, dimethyl dihydrogenated tallow ammonium, methyl ethyl ditallow ammonium, methyl ethyl benzyl tallow ammonium, dimethyl ethyl tallow ammonium, and the mixture thereof.

5. The nano-composite according to claim 1, wherein the clay is selected from the group consisting of mica; synthetic mica; smectites such as montmorillonite (Bentonite), sodium montmorillonite, magnesium montmorillonite, calcium montmorillonite, beidellite, nontronite, hectorite, sodium hectorite, saponite, synthetic saponite, sauconite; pyrophyllite; glauconites; vermiculites; polygorskines; sepiolites; allophanes; imogolites; talc; fluoro-mica; illites; glauconite; phyllosilicates; volkonskoite; sobockite; stevensite; svinfordite; magadiite; kenyaite; kaolinite; dickite; nacrite; anauxite; ledikite; montronite; silicate; halloysite; metahalloysite; sericite; allophone; serpentine clays; chrysotile; antigorite; attapulgite; sepiolite; palygorskite; Kibushi clay; gairome clay; hisingerite; chlorite; and mixtures thereof.

6. The nano-composite according to claim 1, wherein the clay is selected from 2:1 layered silicate clays of the mica, smectite, and vermiculite families.

7. The nano-composite according to claim 1, wherein the weight ratio between the clay and the cationic mediator is from about 30:70 to about 70:30.

8. The nano-composite according to claim 1, wherein at least about 50% (wt) of the clay is exfoliated.

9. The nano-composite according to claim 1, wherein the exfoliated clay has an average between-layer gap greater than about 5 nm.

10. A composition comprising
(i) nano-composite of claim 1, and
(ii) a polymer,
wherein the clay of the nano-composite is exfoliated or intercalated by the cationic mediator or by a mixture of the cationic mediator and the polymer.

11. The composition according to claim 10, wherein the amount of the nano-composite is from about 0.1% (wt) to about 50% (wt), based on the total weight of the composition.

12. The composition according to claim 10, wherein the polymer is selected from the group consisting of polychloroprene, polyethylene, isobutene-isoprene rubber (butyl rubber, IIR), halogenated butyl rubber (HIIR), neoprene rubber, nitrile rubber (NBR), 1,2-polybutadiene, polyallene, polybutadiene (butadiene rubber, BR), polyisobutylene (PIB), polyisoprene, 3,4-polyisoprene, poly(methyl acrylate), poly(methyl vinyl ketone), ethylene-propylene elastomer, polystyrene (PS), polyacrylamide, poly(acrylamide oxime), polypropylene (PP), styrene-butadiene rubber (SBR), poly(methyl methacrylate), acrylonitrile-butadiene-styrene terpolymer (ABS), poly(vinyl chloride) (PVC), poly(vinylidene chloride), poly(vinyl pyridine), poly(vinyl pyrrolidone), poly(acrylic anhydride), polyacrylonitrile, styrene-acrylonitrile copolymer (SAN), ethylene-vinyl acetate copolymer (EVA), and the mixture thereof.

13. The composition according to claim 10, wherein the polymer is selected from the group consisting of polyethers such as poly(oxyethylene), polyformadehyde, poly(phenylene oxide) polyacetaldehyde; polyacrolein, polysulfide, polysulfone, poly(alkylene polysulfide), polyester, polycarbonate, polyphosphate ester, polyamide, polyurea, polyurethane, heterocyclic polymer, polyhydrazides, polyimide, melamine-formaldehyde resin (MF), polysaccharides, phenol-formaldehyde resin (PF), polyanhydride, polysiloxane, polysilane, carborane polymer, organometallic polymers, and the mixture thereof.

14. The composition according to claim 10, wherein the polymer comprises a rubber material selected from the group consisting of butyl rubber, epichlorohydrin rubber, natural rubber, isoprene rubber, chloroprene rubber, styrene rubber, nitrile rubber, ethylene-propylene rubber, ethylene-propylene-diene rubber, butadiene rubber, styrene-butadiene rubber, acrylic rubber, urethane rubber, fluoro rubber, silicone rubber, and mixture thereof.

15. A process for making a rubbery article comprising the steps of
(1) kneading (a) a rubber polymer; (b) a nano-composite of claim 1; and (c) rubber compounding ingredients to produce a mixture;
(2) forming an article from the mixture; and
(3) vulcanizing the article.

16. A tire comprising:
(i) nano-composite comprising
(a) a clay, and
(b) a cationic mediator comprised of a hydrophobic unit and a cationic unit,
the cationic mediator comprising one of the following compounds:

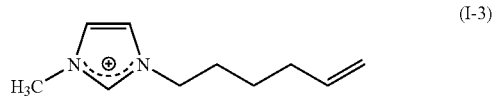

(I-3)

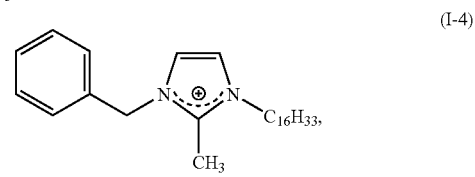

(I-4)

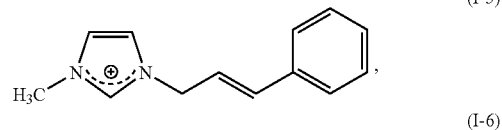

(I-5)

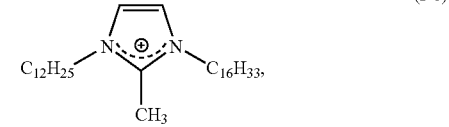

(I-6)

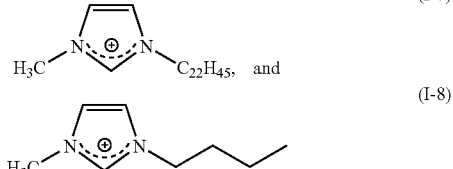

(I-7)

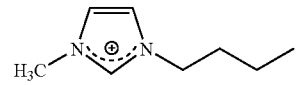

(I-8)

wherein the clay is exfoliated or intercalated by the cationic mediator; and
(ii) a polymer,
wherein the clay of the nano-composite is exfoliated or intercalated by the cationic mediator or by a mixture of the cationic mediator and the polymer.

17. The tire of claim 16 wherein at least about 90% of the clay is exfoliated.

18. The tire of claim 16 wherein the amount of nano-composite is about 1% to about 30% of the total weight of the nano-composite and polymer.

19. The tire of claim 16 wherein the GPI to pure rubber of the polymer and nano-composite is 0.42 to 0.85.

20. The tire of claim 16, wherein the polymer is vulcanized.

21. The tire of claim 16, wherein the polymer is selected from the group consisting of polychloroprene, polyethylene, isobutene-isoprene rubber (butyl rubber, IIR), halogenated butyl rubber (HIIR) such as CIIR and BrIIR, neoprene rubber, nitrile rubber (NBR), 1,2-polybutadiene, polyallene, polybutadiene (butadiene rubber, BR), polyisobutylene (PIB), polyisoprene, 3,4-polyisoprene, poly(methyl acrylate), poly(methyl vinyl ketone), ethylene-propylene elastomer, polystyrene (PS), polyacrylamide, poly(acrylamide oxime), polypropylene (PP), styrene-butadiene rubber (SBR), poly(methyl methacrylate), acrylonitrile-butadiene-styrene terpolymer (ABS), poly(vinyl chloride) (PVC), poly(vinylidene chloride), poly(vinyl pyridine), poly(vinyl pyrrolidone), poly(acrylic anhydride), polyacrylonitrile, styrene-acrylonitrile copolymer (SAN), ethylene-vinyl acetate copolymer (EVA), and the mixture thereof.

* * * * *